UNITED STATES PATENT OFFICE.

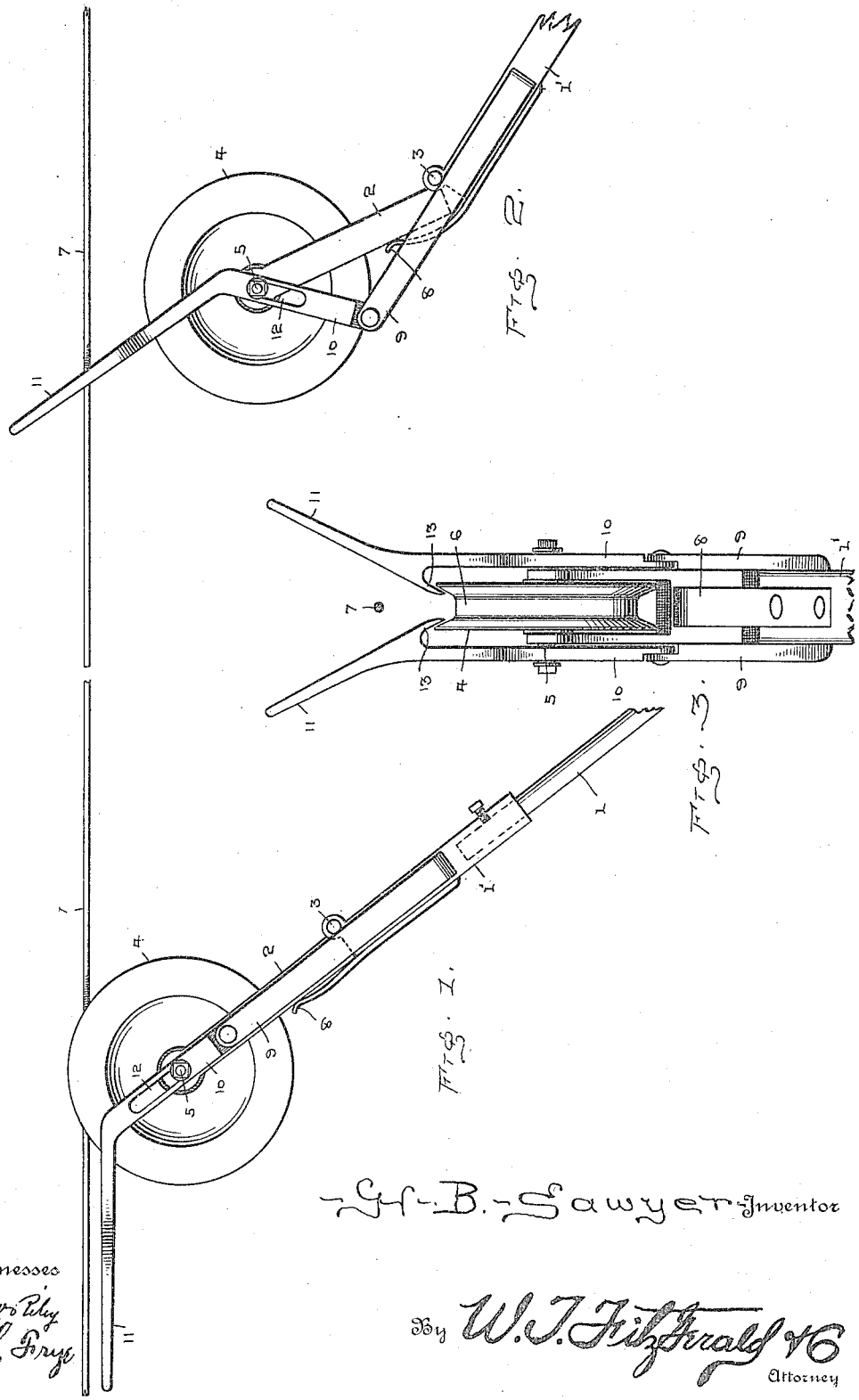

HARRY B. SAWYER, OF OGDEN, UTAH.

TROLLEY FINDER OR CATCHER.

1,206,382.  Specification of Letters Patent.  Patented Nov. 28, 1916.

Application filed December 11, 1915. Serial No. 66,300.

*To all whom it may concern:*

Be it known that I, HARRY B. SAWYER, a citizen of the United States, residing at Ogden, in the county of Weber and State of Utah, have invented certain new and useful Improvements in Trolley Finders or Catchers; and I do hereby declare the following to be a full, clear, and exact description of the invention, such as will enable others skilled in the art to which it appertains to make and use the same.

My invention relates to new and useful improvements in trolley finders or catchers, and my object is to provide a harp for engagement with a trolley pole and a hinged section to which the trolley wheel is rotatably attached.

A further object is to so arrange the hinged section that when the trolley wheel is in engagement with the trolley wire, the strength of the pole supporting spring will hold the hinged section in alinement with the pole.

A further object is to provide spring means for disposing the hinged section at an angle to the pole when the trolley wheel is disengaged from the trolley wire.

A further object is to provide finding fingers for guiding the trolley into engagement with the trolley wire when the wheel disengages therefrom. And a further object is to so arrange said fingers that they will be disposed out of the path of the wire and its hangers when the trolley wheel is in engagement with the trolley wire.

Other objects and advantages will be hereinafter set forth and more particularly pointed out in the accompanying specification.

In the accompanying drawing which is made a part of this application, Figure 1 is a side elevation of the upper end of a trolley pole showing my improved attachment applied thereto with the trolley wheel in engagement with the trolley wire. Fig. 2 is a similar view showing the position of the parts when the trolley is disengaged from the trolley wire, and Fig. 3 is an edge elevation of the upper end of the trolley pole and parts attached thereto showing the manner of guiding the trolley wheel into engagement with the trolley wire.

Referring to the drawing in which similar reference numerals designate corresponding parts throughout the several views, 1 indicates the trolley pole which may be made of the usual or any preferred form, to the upper end of which is secured a harp 1', said harp having an extension 2, attached thereto, by means of a hinge 3, said hinge being attached to the forward face of the harp and extension.

The upper end of the extension 2 is bifurcated to receive a trolley wheel 4 which may be of the usual or any preferred construction, said wheel being rotatably mounted in the bifurcated end of the extension by extending a shaft 5 traversely through the upper end of the extension and trolley wheel. The periphery of the trolley wheel is provided with a channel 6, as is usual, for the reception of the trolley wire 7, said wire being suspended in the usual or any preferred manner.

In order to cause the extension 2 to swing forwardly on its hinge and move out of alinement with the trolley pole 1, a spring 8, of any preferred structure, preferably a flat leaf spring, is attached at one end to the rear face of the harp, while the opposite end thereof is curved inwardly and engages the rear face of the extension 2 so that as soon as the pressure of the trolley wheel against the trolley wire is removed, the tension of the free end of the spring 8 will immediately force the extension forwardly.

Attached to the harp 1', and on diametrically opposite sides thereof are arms 9, the upper ends of which project a distance beyond the point of hinging between the harp and extension, said ends having pivotally attached thereto, finder fingers 10, portions of which extend parallel with the opposite faces of the trolley wheel, the upper ends 11 of the fingers being bent outwardly away from each other and also rearwardly and out of alinement with the remaining portion of the fingers so that when the extension is in alinement with the trolley pole, the ends 11 of the fingers will rest in a plane substantially parallel with the trolley wire and a distance below the same so that said fingers will not come in contact with the hangers and stay wires used for supporting the trolley wire.

The pivoted portion of the fingers 10 is provided with elongated slots 12 through which the ends of the shaft 5 project so that the fingers will have a sliding movement on the shaft which will result in swinging the flared ends of the fingers to a substantially vertical position when the extension 2 is moved forwardly, thereby disposing said fingers on opposite sides of the trolley wire so that when the trolley pole is again moved upwardly the trolley wheel will be guided into engagement with the wire, and as soon as the trolley wheel engages the wire, the forward pull on the trolley pole will overcome the tension of the spring 8 and swing the extension back into alinement with the trolley pole, this action moving the shaft 5 to the lower end of the slots 12 and disposing the flared ends of the fingers to a position below the trolley wire and parallel therewith.

In order to positively guide the trolley wire into the channel of the trolley wheel, the fingers 10, at their point of bending rearwardly and outwardly are provided with inwardly and downwardly projecting prongs 13 which overhang the flanges at the edges of the wheel, thus preventing the wire from passing between the wheel and arm as the wheel moves into engagement with the wire.

In operation, the trolley pole is swung into alinement with the trolley wire when the spring (not shown) employed for holding the trolley pole in elevated position will move the pole upwardly and forwardly until the flared ends of the fingers pass on opposite sides of the wire, the continued upward movement of the pole bringing the wheel into engagement with the wire and overcoming the tension of the spring 8 whereupon the extension 2 will assume its initial position and cause the fingers to move out of engagement with the trolley wire. Should, for any reason, the trolley wheel leave the wire, the spring 8 will immediately exert forward tension on the extension 2 which will result in moving the fingers into position on opposite sides of the wire so that one or the other of the fingers will engage the wire and guide the trolley wheel back into engagement therewith when the trolley pole again assumes its natural position.

In view of the simplicity of this device, it can be very cheaply constructed and can be applied to use in connection with any preferred form of trolley pole.

It will likewise be seen that there will be no parts of the device in position to contact with the trolley supporting wires when the trolley is in engagement with the wire.

Having thus fully described my invention what I claim as new and desire to secure by Letters-Patent of the United States, is:—

The combination with a trolley pole, of a harp, a socket at one end of the harp, means to lock the end of said pole in said socket, a bifurcated extension hingedly secured to the harp, a spring carried by the harp adapted to swing said extension forwardly and upwardly out of alinement with the pole when the pole is moved to inoperative position, a shaft extending through the bifurcated end of said extension, a trolley wheel rotatably mounted on said shaft between the arms of the extension, a pair of arms fixed to said harp, a pair of fingers having one of their ends pivotally attached to the free ends of said arms, an elongated slot through said fingers at a point beyond the pivotal connection of the fingers with the arms, said slots receiving the ends of said shaft, the ends of said fingers beyond said slots being outwardly and rearwardly inclined and inwardly and downwardly inclined prongs on said fingers, said prongs being extended a distance over the inner faces of the flanges of the trolley when the trolley is in inoperative position and moved a distance from the trolley wheel when the wheel is in operative position.

In testimony whereof I have signed my name to this specification in the presence of two subscribing witnesses.

HARRY B. SAWYER.

Witnesses:
JAMES J. BRUMMITT,
A. J. VICKS.

Copies of this patent may be obtained for five cents each, by addressing the "Commissioner of Patents, Washington, D. C."